United States Patent [19]

Richardson

[11] 4,349,919

[45] Sep. 14, 1982

[54] TRANSMITTER/RECEIVERS CAPABLE OF CONTEMPORANEOUS TRANSMISSION/RECEPTION

[75] Inventor: Christopher K. Richardson, Romsey, England

[73] Assignee: Plessey Handel und Investments AG, Zug, Switzerland

[21] Appl. No.: 164,146

[22] Filed: Jun. 30, 1980

[30] Foreign Application Priority Data

Jul. 6, 1979 [GB] United Kingdom ............... 7923731

[51] Int. Cl.³ ........................ H04B 7/16; H04B 1/54
[52] U.S. Cl. ..................................... 455/23; 455/21; 455/86; 329/124
[58] Field of Search ................... 455/20, 21, 23, 24, 455/73, 74, 75, 84–86, 207, 209, 336, 337, 276, 265; 329/50, 122, 124, 112

[56] References Cited

U.S. PATENT DOCUMENTS

| | | | |
|---|---|---|---|
| 3,370,241 | 2/1968 | Saraga | 329/50 |
| 3,456,196 | 7/1969 | Schneider | 455/265 |
| 3,744,015 | 7/1973 | Marimon | 455/307 |
| 3,768,030 | 10/1973 | Brown | 329/122 |
| 3,835,392 | 9/1974 | Mahner | 455/276 |
| 3,961,262 | 6/1976 | Gassmann | 329/50 |
| 4,134,068 | 1/1979 | Richardson | 455/23 |

FOREIGN PATENT DOCUMENTS 1172975 12/1969 United Kingdom .
1172976 12/1969 United Kingdom .
1172977 12/1969 United Kingdom .

*Primary Examiner*—Tommy P. Chin
*Attorney, Agent, or Firm*—Fleit & Jacobson

[57] ABSTRACT

A transceiver comprising an oscillator/modulator adapted for angle modulation and providing an output signal for transmission wherein the phase deviation does not substantially exceed 90°, an aerial for transmitting the output signal and for accepting received signals, a first mixer for mixing the transmission signal from the oscillator/modulator with the received signal, a second mixer for mixing the transmission signal from the oscillator/modulator with the received signal, a phase quadrature device arranged so that one of the signals fed to the first mixer is in phase quadrature with the corresponding signal fed to the second mixer and a demodulator fed with signals from the mixers, the demodulator comprising two band pass filters fed one from each mixer, a phase shifter effective for imposing a differential phase shift of substantially 90° between the output signals from the two filters and a combiner to which output signals from the phase shifter are fed and which provides a demodulated output signal.

11 Claims, 1 Drawing Figure

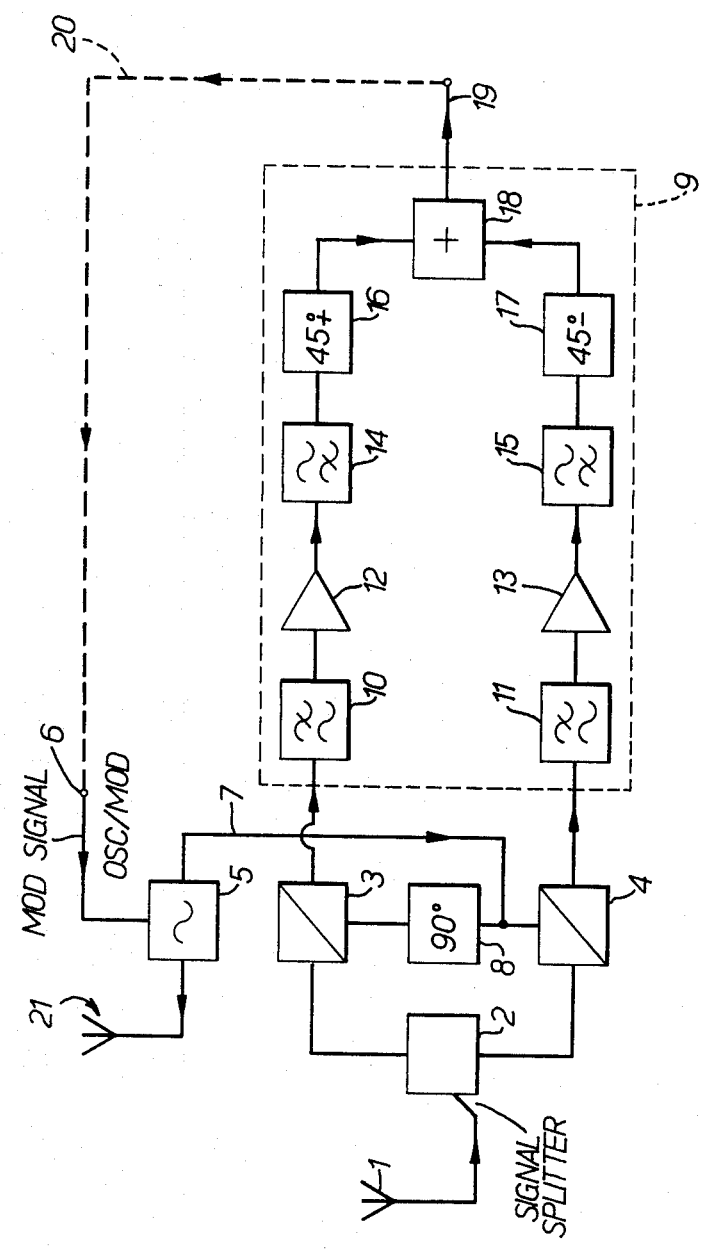

4,349,919

TRANSMITTER/RECEIVERS CAPABLE OF CONTEMPORANEOUS TRANSMISSION/RECEPTION

BACKGROUND OF INVENTION

This invention relates to common channel duplex transceivers and is related to and represents an improvement over the invention which forms the subject of our G.B. Patent Application No. 10360/75 corresponding to U.S. Pat. No. 4,134,068.

The transceiver described in the specification accompanying our G.B. Patent Application No. 10360/75, now U.S. Pat. No. 4,134,068 is not ideal for communication between more than two transceivers because of a capture effect which favours a strong signal at the expense of a weaker signal.

SUMMARY OF INVENTON

According to the present invention a transceiver comprises oscillator/modulator means adapted for angle modulation and providing an output signal for transmission wherein the peak phase deviation does not substantially exceed 90°, aerial means for transmitting said output signal and for accepting a received signal, first mixing means for mixing said transmission signal from said oscillator/modulator means with said received signal, second mixer means for mixing said transmission signal from said oscillator modulator means with said received signal, phase quadrature means arranged so that one of the signals fed to the first mixer means is in phase quadrature with the corresponding signal fed to the second mixer means and demodulator means fed with signals from the mixers, the demodulator means comprising two band pass filter means fed one from each mixer, phase shift means effective for imposing a differential phase shift of substantially 90° between output signals from the two filter means and combiner means to which output signals from the phase shift means are fed and which provides a demodulated output signal.

The band pass filter means may each comprise two filters coupled to series one of which is a low pass filter and the other of which is a high pass filter.

The low pass filters may be fed from respective mixers and may each be coupled via an amplifier to feed its associated high pass filter.

The pass band of the band pass filter means may be approximately 300 Hz to 3 Khz and so if two filters are used connected in series, the low pass filter will have a cut off of approximately 3 Khz and the high pass filter will have a cut off of approximately 300 Hz.

The differential phase shift means may comprise two phase shifters fed one from each mixer and affording between them a total differential phase shift of 90°. In one embodiment one phase shifter provides a phase shift of 45° positive whilst the other phase shifter provides a phase shift of 45° negative.

The combiner means may be a signal adder.

The oscillator/modulator means may comprise an oscillator capable of being angle modulated.

The received modulation may be fed back from the demodulator means to the oscillator/modulator means whereby a radio relay function is provided.

Although two aerials one for transmission and one for reception may be used a single aerial may alternatively be used for both of these functions.

The phase quadrature means may be used to provide a phase quadrature relationship between received signals fed to the mixers from the aerial means or alternatively the phase quadrature means may be used to provide a phase quadrature relationship between signals fed to the mixers from the oscillator/modulator.

Various embodiments of the present invention are possible and any of the transceiver embodiments described in our co-pending U.K. patent application No. 10360/75, now U.S. Pat. No. 4,134,068, may be used, except that the oscillator for providing the local oscillator for the mixers of the transceiver is adapted to provide a peak phase deviation not exceeding 90° approximately and wherein the mixers of the transceiver are arranged to feed a demodulator of the kind used in a transceiver according the present invention i.e. haing two band pass filters, differential phase shift means providing a 90° phase shift between output signals from the band pass filters and combiner means.

In a common channel duplex system according to the present invention contemporaneous communication between more than two transceivers is possible because the undesirable capture effect is not apparent due to the fact that the peak phase modulation is limited preferably to 90° or less.

BRIEF DESCRIPTION OF DRAWING

The drawing shows one embodiment of the invention, which is a generally schematic block diagram of a common channel duplex transceiver.

DESCRIPTION OF PREFERRED EMBODIMENT

Referring now to the drawing, a common channel duplex transceiver comprises a receiver aerial'1 coupled via a signal splitter 2 to a pair of mixers 3 and 4. Local oscillator signals are fed to the mixers 3 and 4 from an oscillator/modulator 5 comprising an oscillator, signals from which are frequency or phase modulated by signals applied to the oscillator/modulator 5 on line 6. Local oscillator signals for the mixers 3 and 4 are fed from the oscillator/modulator 5 via line 7. A phase quadrature device 8 is provided to ensure that the local oscillator signals applied to the mixers 3 and 4 are in phase quadrature. It should be understood that a 90° phase relationship must exist between one pair of corresponding signals applied to the mixers 3 and 4 and so alternatively the signal splitter 2 may be arranged to provide a 90° phase relationship between input signals fed to the mixers 3 and 4 from the aerial 1. In this case the signal splitter might comprise a 90° hybrid coupler and the phase quarature device 8 would not be required.

Output signals from the mixers 3 and 4 are fed to a demodulator arrangement, shown within the broken line 9, comprising a pair of low pass filters 10 and 11, a pair of amplifiers 12 and 13, a pair of high pass filters 14 and 15 and a pair of phase shift devices 16 and 17, which provide in combination a differential phase shift of 90°, output signals from the phase shifters 16 and 17 being fed to an adder 18. The filters 10 and 14 are chosen so as to have a pass band characteristic extending between 300 Hz and 300 Khz and the corresponding filters 11 and 15 are chosen to have a similar characteristic. Although the present embodiment shows separate low pass and high pass filters such as the filters 10 and 14 or the filters 11 and 15 it will be appreciated that a single band pass filter may be provided having the desired band pass characteristics, such filters being fed from the mixers 3 and 4 respectively. The high pass filter characteristic is chosen so as to remove any beat frequency between the carrier frequency of the oscillator/modulator (local oscillator frequency) and the received carrier frequency. For this purpose a cut off of about 300 Hz is practicable. The phase shift devices 16 and 17 are chosen as hereinbefore mentioned to have a total differential phase shift of 90° and in the present example the phase shifter 16 shifts the phase of signals from the filter 14 by 45° positive whereas the phase shifter 17 shifts the phase of signals from the filter 15 by 45° negative but other angles of shift are possible provided they have a 90° differential approximately. Output signals on line 19 from the adder 18 may be fed back via the broken line 20 to phase modulate the oscillator/modulator 5. Signals on the line 19 correspond to the modulation carried by signals received at the aerial 1 and by feeding the signal on line 19 back to modulate the oscillator/modulator 5 via the line 20 received signals are re-transmitted aerial 21 which is connected to the oscillator/modulator 5. In this way a radio relay function may be provided.

By utilising a system as just before described wherein it is arranged that peak phase deviation achieved by modulation of the oscillator/modulator 5 is always less than 90° and by limiting the band width of the received signals by means of the filters 10, 14, 11 and 15 a system is provided wherein contemporaneous transmission and reception between more than two transceivers is facilitated.

Any oscillator/modulator in which the peak modulation does not exceed 90° may be used and it will be appreciated by those skilled in the art that most kinds of phase modulator devices fall into this category since it normally requires a special design to provide for peak phase excursions in excess of 90°. Although limited excursions of a little more than 90° may be tollerated such excursions produce distortion which although it may be acceptable in some applications, is obviously generally undesirable.

Various modifications may be made to the arrangement shown and for example the aerials 1 and 21 may be combined so that a common transmitter/receiver aerial is utilised and such a system is described in our co-pending G.B. Patent Application No. 10360/75. The transceiver described in the present application is shown in its simplist form. Alternatively the demodulator shown within the broken line 9 may be fed from the two main mixers as shown in any of the embodiments of the specifications accompanying our G.B. Patent Application No. 10360/75.

What we claim is:

1. A communication transmitter/receiver for contemporaneous transmission and reception between more than two such transmitter/receivers, the transmitter/receiver comprising:

oscillator means, capable of being phase modulated in accordance with a phase deviation, for providing an oscillator output signal for transmission, wherein the phase deviation does not substantially exceed 90°;

aerial means for transmitting said oscillator output signal and for accepting a received signal;

first mixer means for mixing said oscillator output signal for transmission with said received signal to produce a first mixer output signal, said first mixer means having a first input terminal for receiving said oscillator output signal for transmission and a second input terminal for receiving said received signal;

second mixer means for mixing said oscillator output signal for transmission with said received signal to produce a second mixer output signal, said second mixer means having a third input terminal for receiving said oscillator output signal for transmission and a fourth input terminal for receiving said received signal;

phase quadrature means operatively associated with said first and second mixer means so as to establish a phase quadrature relationship between said first and second mixer output signals; and demodulator means for receiving and demodulating the first and second mixer output signals having the quadrature relationship therebetween so as to provide for contemporaneous transmission and reception between more than two transmitter/receivers;

wherein said demodulator means comprises two band pass filters, each receiving a respective one of said first and second mixer output signals, and arranged to pass first and second baseband audio frequency signals, respectively, phase shift means operative at an audio frequency for imposing a differential phase shift of substantially 90° between the first and second baseband audio frequency signals from the said first and second filters to produce first and second phase shift output signals respectively, and combiner means for receiving and combining the first and second phase shift output signals, whereby to provide a demodulated output signal.

2. A transceiver as claimed in claim 1, wherein the phase shift means comprises two phase shifters, each fed from a respective one of said two band pass filters and affording between them a total differential phase shift of 90°.

3. A transceiver as claimed in claim 2, wherein one of said two phase shifters provides a phase shift of 45° positive, while the other of said two phase shifters provides a phase shift of 45° negative.

4. A transceiver as claimed in claim 3, wherein the combiner means comprises a signal adder.

5. A transceiver as claimed in claim 4, wherein each of the two band pass filters comprises a low pass filter coupled in series with a high pass filter.

6. A transceiver as claimed in claim 5, wherein each said low pass filter is fed from a respective one of said first and second mixer means, and is coupled, via an amplifier, to its corresponding high pass filter.

7. A transceiver as claimed in claim 6, wherein the pass band of the band pass filters is approximately 300 Hz to 3 kHz.

8. A transceiver as claimed in claim 7, wherein the oscillator means comprises an oscillator capable of being angle modulated.

9. A transceiver as claimed in claim 8, wherein said phase quadrature means comprises a hybrid coupler connected between said aerial means, on the one hand, and said first and second mixer means, on the other hand, for establishing a quadrature relationship between said received signals provided thereto from the aerial means.

10. A transceiver as claimed in claim 8, wherein said phase quadrature means comprises a phase quadrature circuit connected between said oscillator means and one of said first and second mixer means for establishing a quadrature relationship between the oscillator output signals for transmission provided to said first and second mixer means, respectively.

11. A transceiver as claimed in claim 1, wherein said demodulator means provides a demodulator output signal, said transceiver comprising feedback means for feeding the demodulator output signals back from the demodulator means to the oscillator means, said oscillator means modulating the oscillator output signals in accordance therewith, whereby to provide a radio relay function.

* * * * *